(12) United States Patent
Kennis (10) Patent No.: US 9,721,291 B1
(45) Date of Patent: Aug. 1, 2017

(54) IDENTIFYING EFFECTIVE IMAGES ASSOCIATED WITH ITEMS

(75) Inventor: Albert J. Kennis, Shizuoka (JP)

(73) Assignee: Amazon Technologies, Inc., Reno, NV (US)

(*) Notice: Subject to any disclaimer, the term of this patent is extended or adjusted under 35 U.S.C. 154(b) by 785 days.

(21) Appl. No.: 13/421,591

(22) Filed: Mar. 15, 2012

(51) Int. Cl.
*G06Q 30/00* (2012.01)
*G06Q 30/06* (2012.01)

(52) U.S. Cl.
CPC ......... *G06Q 30/0643* (2013.01); *G06Q 30/06* (2013.01)

(58) Field of Classification Search
CPC .......................................... G06Q 30/00–30/08
USPC ................................................ 705/26.1–27.2
See application file for complete search history.

(56) References Cited

U.S. PATENT DOCUMENTS

| | | | |
|---|---|---|---|
| 2006/0155567 A1* | 7/2006 | Walker et al. | 705/1 |
| 2008/0275852 A1* | 11/2008 | Nakamura | 707/3 |
| 2011/0173082 A1* | 7/2011 | Breitenbach et al. | 705/16 |
| 2013/0080426 A1* | 3/2013 | Chen et al. | 707/723 |
| 2014/0164146 A1* | 6/2014 | Goswami et al. | 705/14.72 |

OTHER PUBLICATIONS

"The effects of banner ad size and time cost on brand attitude and click -through". Ahn, Euijin. Michigan State University, ProQuest Dissertations Publishing, 2001.*

* cited by examiner

*Primary Examiner* — Michael Misiaszek
(74) *Attorney, Agent, or Firm* — Thomas|Horstemeyer, LLP (57) ABSTRACT

Disclosed are various embodiments for identifying a best or most effective image associated with an item. A user interface is generated that includes the item as well as one of a plurality of images associated with the item. Interactions associated with the item are monitored and an image score is adjusted based upon whether these interactions are positive are negative. The process can be repeated over a large sample size. A highest scored image is designated as the most effective image at achieving a particular result.

20 Claims, 7 Drawing Sheets

IDENTIFYING EFFECTIVE IMAGES ASSOCIATED WITH ITEMS

BACKGROUND

Items are often associated with an image in, for example, an electronic commerce system. These items are often associated with multiple images, where one of the images is selected as a primary image that is initially displayed in a user interface. For example, a search result user interface incorporating an item can display the primary image as a thumbnail image. As another example, a detail page associated with the item, such as, for example, a product detail page, may initially display one of these images while allowing the user to view other images associated with the item in an image user interface element.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the disclosure are directed to selecting an image from among multiple images associated with an item. In one embodiment, a machine learning algorithm can be employed to track metrics associated with an item, such as, for example, a click through rate and/or a conversion rate, and identify a highest scored, or "best" image associated with the item. To identify a highest scored image, the machine learning algorithm is configured to identify one the images associated with the item that yields a particular result more often than the other images associated with the item. As one example, the machine learning algorithm to can be configured to identify an image associated with the item that yields a highest click through rate, the highest sales in an electronic commerce system, the highest amount of user engagement (e.g., mouse-over time, user attention, etc.). To make such a determination, the machine learning algorithm is configured to present all of the images associated with the item to various users and track the users' positive and/or negative interactions with the item. These interactions can in turn be associated with the image presented with the item and a score corresponding to the image tracked in order to identify a highest scored image.

Figure 1:
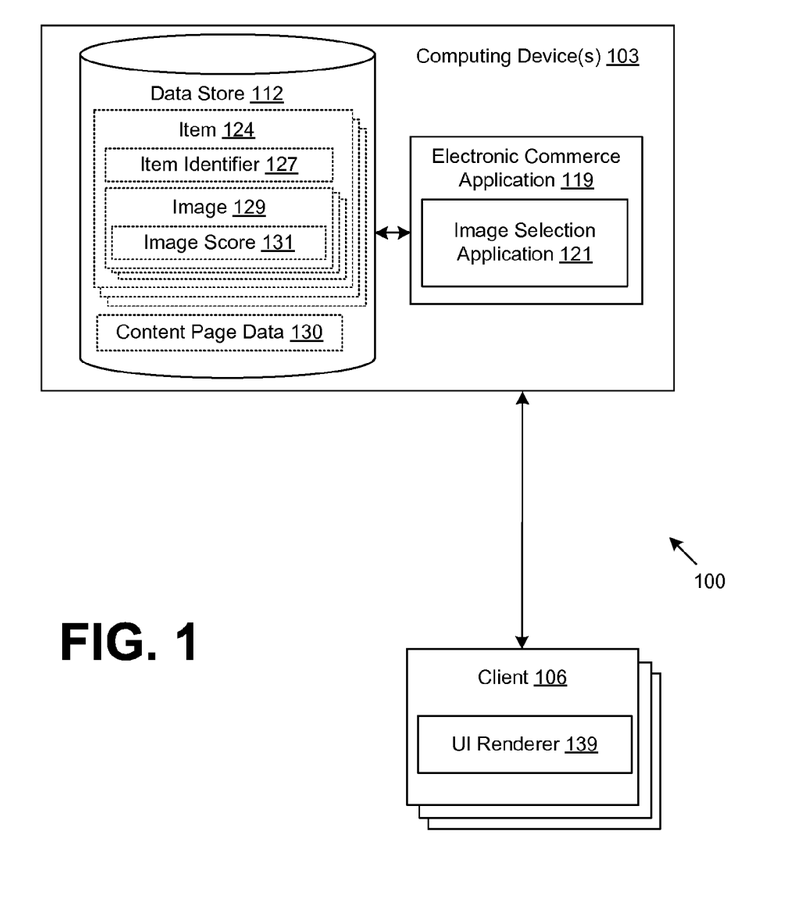
FIG. 1 is a drawing of a networked environment in which an image selection application according to one embodiment of the disclosure can be implemented.

The depicted networked environment 100 illustrates one example of an implementation of a system according to an embodiment of the disclosure. It should be appreciated that embodiments of the disclosure can be implemented in various ways. The networked environment 100 includes at least one computing device 103 and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

The components executed on the computing device 103, for example, include an electronic commerce application 119, an image selection application 121, and other applications, services, processes, systems, engines, or functionality not discussed in detail herein. The electronic commerce application 119 can facilitate an electronic commerce site associated with one or more retailers through which customers can purchase, rent, and/or download products. To this end, the electronic commerce application 119 can process orders on behalf of customers and transmit network pages or other user interface elements that can be rendered on a client 106. The electronic commerce application 119 can also generate user interfaces or content pages requested by a user via a client 106, which may include images associated with items. For example, a user on a client 106 may submit a search query in a search engine provided by the electronic commerce application 119, and the electronic commerce application 119 can generate a search result user interface that presents items identified by a search engine to be relevant to the search query. In such a user interface, an image associated with each of the search results, if available, can also be presented in some form (e.g., a thumbnail image presented alongside information about the item, etc.).

As another example, the a user may request via a client 106 an item detail page (or a product detail page), and the electronic commerce application 119 can generate an item detail user interface that presents information about the item that includes user interface elements that allow the user to view the various images associated with the item. In such a user interface, the electronic commerce application 119 can present an initial image of the item and the user interface can allow the user to select the other images if he or she chooses. Additionally, a user may request the electronic commerce application 119 can receive data from a client 106 pertaining to product selections, payment information, and other data necessary to effectuate an electronic commerce site, which are not discussed herein in detail. Additionally, although the embodiments of the disclosure are discussed herein in the context of an electronic commerce system, it should be appreciated that alternative embodiments may not involve such a system. For example, embodiments of the disclosure can be implemented in the context of a search engine that presents search results with a thumbnail image. As an additional example, embodiments of the disclosure can also be implemented in the context of a site that presents images of any type of items where a primary or thumbnail image is shown before a user views additional information about the item.

The image selection application 121 can, in conjunction with the electronic commerce application 119, select a primary image that can be placed in a user interface generated by the electronic commerce application 119, whether such a user interface is a search result user interface, an item detail user interface, or any other type of user interface. In one embodiment, when content is requested from a client 106, the electronic commerce application 119 can request that the image selection application 121 designate a primary image that should be presented in the user interface generated by the electronic commerce application 119. The primary image can comprise a default image in a user interface, a thumbnail image shown with an item, or in any other type of user interface in which one image out of a plurality of images associated with the item is chosen. As discussed herein, in such a scenario, the image selection application 121 can include a machine learning algorithm that conducts experiments by designating one of the various images associated with an item as the primary image for a current iteration of one of the experiments, observing the interactions of the user, and scoring the image based upon the interactions of the user. Accordingly, the user interface generated by the electronic commerce application 119 can include code that allows the image selection application 121 to observe the user's interactions with the various user interface elements. The image selection application 121 can identify a highest scored image out of a plurality of images associated with the item based on the observed user interactions. The highest scored image represents one of a plurality of images associated with the item that achieves a particular result (or results) more often that the other images. The functionality of the image selection application 121 in this regard is discussed in further detail below.

The data stored in the data store 112 includes data accessed by the components executing on the computing device 103, for example, information about items 124, content page data 130, as well as potentially other data. The items 124 can represent, for example, a product catalog in an electronic commerce system, a corpus of search results employed by a search engine, or any other type of items with which images can be associated. Items 124 can be associated with an item identifier 127 that uniquely identifies the item among a corpus of items 124. Additionally, each item 124 is also associated with one or more images 129. Each of the images 129 are in turn associated with an image score 131. The image score 131 can represent a measure of how effective an image 129 is at achieving a particular result as determined by the image selection application 121. In other words, highest scored image 129 can be thought of as the most effective image 129 associated with the item according to criteria with which the image selection application 121 can be configured, or one that the image selection application 121 can determine via a machine learning algorithm.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a user interface renderer 139 and other applications. The user interface renderer 139 can comprise a browser that is executed in a client device 106, for example, to access and render network pages, such as web pages, or other network content served up by the image selection application 121 and/or electronic commerce application 119. The client device 106 may be configured to execute applications beyond such a user interface renderer 139 such as, for example, email applications, instant message applications, and/or other applications.

Next, a general description of the operation of the various components of the networked environment 100 is provided. To begin, as noted above, the image selection application 121 can determine a highest scored image 129 associated with an item 124 by executing a machine learning algorithm that monitors interactions of users with items 124 presented in a user interface and identifies whether the user's interactions represent positive interactions, negative interactions, or any combination thereof. In other words, the inputs to the machine learning algorithm are a particular image 129 associated with an item 124 as well as the user interactions with the user interface that includes the image 129, and the outputs of the machine learning algorithm are an image that is designated as the primary or highest scored image as well as a score (e.g., a confidence score) associated with the image 129.

In operation, the image selection application 121 can cause a randomly selected image from among the images 129 associated with a particular item 124 as a primary image in a user interface served by the computing device 103 to a client 106. Accordingly, as a user interacts with a user interface, the image score 131 associated with the image 129 is adjusted based upon the user's interactions. In other words, the machine learning algorithm can conduct various experiments across a population of users in which it determines the highest scored image. The population of users can represent any sized subset of all users requesting content that results in the particular item being presented in a user interface.

As noted above, the image selection application 121 can identify whether the user's interactions with the item in the user interface represent positive interactions and/or negative interactions. For example, in the non-limiting case of a search result user interface in which an item is presented along with a thumbnail image chosen from among the various images 129 associated with the item 124, a positive interaction can comprise a user following a link associated with the item, which can comprise, but is not limited, a link to purchase the item, find out any additional information, and/or to visit a site associated with the item. As another example, a positive interaction can comprise any indication that the user has an interest in the item. For example, the user interface provided to the client 106 can include client side code that allows mouse-over time to be detected. Therefore, if a user hovers a pointer around or near an item for a period of time exceeding a threshold, such an interaction can be deemed a positive interaction. As an alternative example, if a user taps the item, zooms in on the item, focuses the item, or in any way indicates that the attention of the user is drawn to the item, any of these interactions can also be designated as positive interactions.

The user's interactions with the item can be tracked across a session, and the positive interactions across the session can cause adjustment of the image score 131. For example, if a search result user interface presents a list of various items, and the user eventually views an item detail page corresponding to one of the items, views other content or information about the item, and eventually purchases the item, one or more of these various types of interactions can represent positive interactions that are associated with the particular image 129 chosen as the primary image in the initial search result user interface.

Upon identifying a positive interaction with an item by a user on a client 106, the image selection application 121 identifies an amount by which the image score 131 of the image 129 should be adjusted. In some embodiments, the image selection application 121 can be configured with an amount by which the image score 131 should be adjusted in response to identifying a positive interactions. Therefore, positive interactions can be assigned varying weights. In other words, certain positive interactions can cause a greater positive adjustment to the image score 131 than others. For example, continuing the example of a search result user interface, if a user clicks on a link associated with an item 124, such an interaction can be given a certain positive weight. If the user purchases the item 124 from an electronic commerce system, such an interaction can be given an even greater positive weight.

To illustrate examples of negative interactions, continuing the above example of a search result user interface, if a user fails to interact with a particular item 124 in the search results, such an interaction can comprise a negative interaction associated with the image 129 chosen as the primary image. If a user selects a different item over the item, such an interaction can also comprise a negative interaction associated with the image 129 chosen as the primary image. If a user abandons the search result user interface and conducts another search, such an interaction can also comprise a negative interaction associated with the image 129. Upon detecting a negative interaction, the image score 131 associated with the image 129 can be adjusted to reflect the negative interaction. As in the case of positive interactions, various negative interactions can also be assigned various weights.

Therefore, the image selection application 121 can identify the highest scored image from among a plurality of images. In some embodiments, the image selection application 121 can be configured to identify the "best" image along with a confidence score representing a confidence level in the effectiveness of the image in achieving a particular result. The confidence score can be representative of the sample size from which a determination of a primary image is made (e.g., a larger sample size typically results in a higher confidence score). The best image can comprise an image 129 associated with an image score 131 that is greater than the remaining images 129 of the item 124 by a threshold. In other words, the best image 129 is the one that emerges as the most effective at achieving a particular result. The machine learning algorithm of the image selection application 121 can be configured to identify the highest scored or best image by identifying one that maximizes a particular metric, such as sales of an item in an electronic commerce system, profitability of the electronic commerce system, click-through rate associated with the item, or any other metric. Therefore, the machine learning algorithm can also be configured with the flexibility to alter the weights assigned to positive and negative interactions to maximize such a metric. In other words, the machine learning algorithm can autonomously alter the weights assigned to the various interactions with which it is configured to track in order to maximize a given metric.

Upon identifying a highest scored image (also referred to herein as a most effective image, best image, etc.) such an image 129 can be designated as the primary image associated with the item 124 for subsequent cases where a primary image is placed in a user interface along with information about the item 124 (e.g., in a search result user interface, item detail page). In some embodiments, the image selection application 121 can continue to conduct experiments and adjust the image score 129 associated with each of the item's images by randomly placing images 129 associated with the item 124 and monitoring user interactions even after the most effective image is identified. In other words, the image selection application 121 can continue to refine the image score 131 of each image 129 associated with an item, as the best or most effective image may change over time as the behavior and interests of users may likewise change over time.

As an alternative embodiment of the machine learning algorithm employed by the image selection application 121, instead of randomly selecting an image 129 to display in a user interface associated with a corresponding item 124, the image selection application 121 can select the highest scored image according to a weighting system that is based upon the image score 131 of the various images 129 or a confidence score associated with designation of the image 129 as the primary image. In this way, the image selection application 121 can display the best or most effective image 129 more often than less effective images 129 associated with the item while still allowing the less effective images 129 an opportunity, at a later point in time, to emerge as the most effective image 129. Additionally, in some embodiments, if one or more new images 129 is provided in association with the item 124 in the data store 112, the image selection application 121 can reset the image scores 131 of images 129 corresponding to the item 124.

Figure 2:
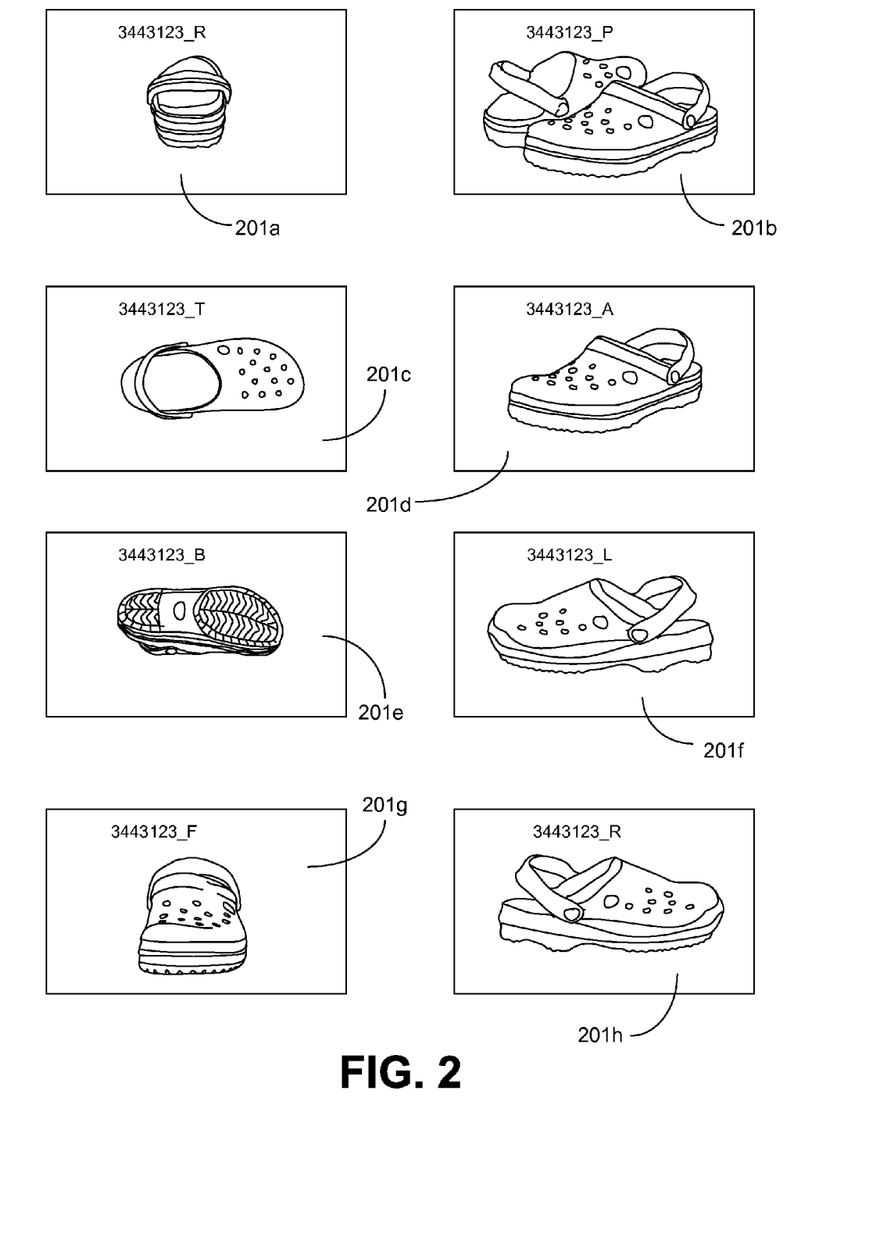
FIG. 2 is an example of images that are associated with an item in the networked environment of FIG. 1 according to various embodiments of the disclosure.

Reference is now made to FIG. 2, which illustrates example images 201 that are associated with a particular item 124. As can be seen in the example images 201 of FIG. 2, various images can be associated with an item, and the best or most effective image can be difficult to identify without the benefit of a large sample size of user interactions with a user interface that includes each of the images 201. Therefore, when a user requests content from the electronic commerce application 119 that includes a user interface where one of the images 201 displayed in association with the corresponding item 124, the image selection application 121 selects one of the images to present in the user interface. As noted above, the selection can be random or weighted according to the image score 131 or a confidence score corresponding to identification of one of the images 201 as a primary image. Therefore, as is shown in the subsequent example user interfaces, the image selection application 121 can cause each of the images 201 to be presented in a user interface and then monitor user interactions with the user interface to adjust the image score 131 of the image 129.

Figure 3A:
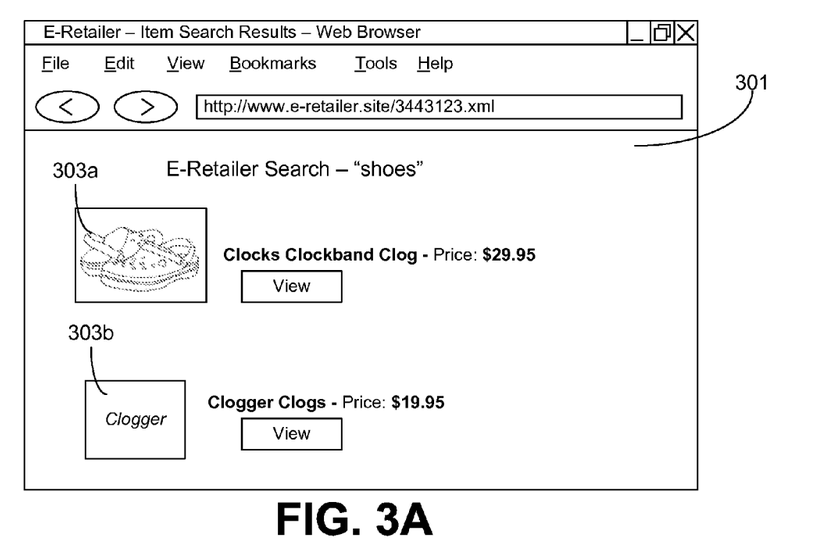
FIGS. 3A-3B are example user interfaces generated by the image selection application and/or the electronic commerce application executed in a computing device in the networked environment of FIG. 1 according to various embodiments of the present disclosure.

Reference is now made to FIG. 3A, which illustrates an example user interface 301 that can be generated by the electronic commerce application 119 and rendered by the user interface renderer 139 on a client 106. The depicted user interface 301 can be generated in coordination with the image selection application 121. In other words, the electronic commerce application 119 can receive a request for content from a client 106, and the image selection application 121 can provide an indication of which of the images should be placed in the user interface along with an item 124. In the depicted example, the electronic commerce application 119 and/or image selection application 121 can obtain a search query that is submitted by a client 106 to the computing device 103 and generate a search result user interface the includes a thumbnail image 303 that is selected from one of the images 129 associated with the item 124 in the data store 112.

Accordingly, the image selection application 121 monitors the user's interactions with the user interface 301 to identify positive and/or negative interactions with one of more of the items presented therein. In the depicted example, if a user follows a hyperlink associated with the item corresponding to the image 303a, the image selection application 121 can identify a positive interaction and adjust the image score 131 corresponding to image 303a. In this example, the image selection application 121 can also identify a negative interaction that corresponds to image 303b and adjust the image score 131 of image 303b accordingly. A negative interaction can be identified relative to image 303b because the user indicated interest in the item corresponding to image 303a and not in the item corresponding to image 303b.

Figure 3B:
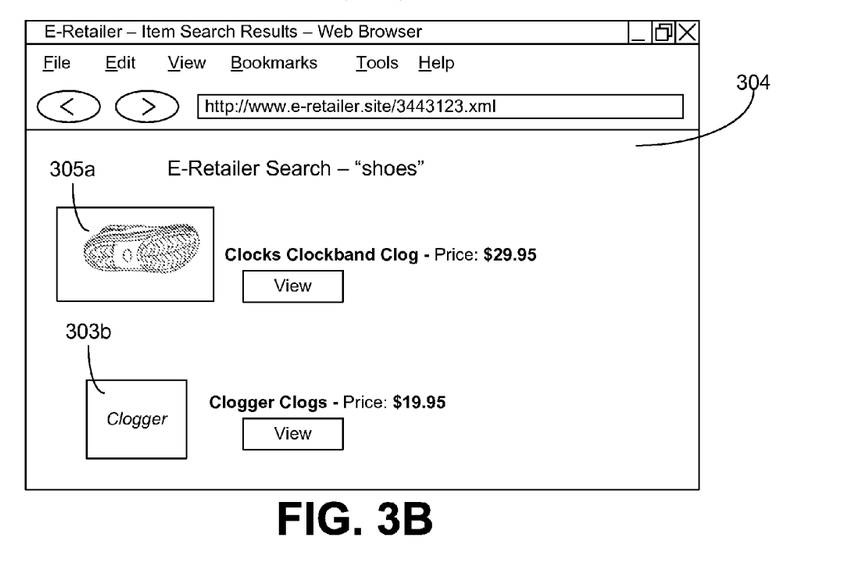

Reference is now made to FIG. 3B, which continues the example of FIG. 3A. In this example, the image selection application 121 can cause a different image 305a to be displayed in the depicted search result user interface 304. In this example, the image selection application 121 can also monitor interactions of the user with content corresponding to the displayed items. In this example, if the user follows a hyperlink corresponding to the item associated with image 303b, a negative interaction is detected with respect to image 303a. As noted above, another example of a negative interaction that can be detected with respect to one of both of images 305a and 303b can be detecting whether the user abandons the search result user interface and submits a new search query to the electronic commerce application 119 and/or image selection application 121. In such a scenario, this user behavior can be indicative of the user's dissatisfaction with the images presented in the user interface 304. Even in a particular case where a user is not actually dissatisfied with the images presented in the user interface 304, because the image selection application 121 is potentially conducting thousands or millions of experiments involving observation of user interactions with images presented in a user interface, the breadth of sample size can overcome such statistical noise.

Additionally, in the case of a search result user interface, as in the examples shown in FIGS. 3A-3B, the image selection application 121 can also disable the experimentation and scoring of an image 129 depending on the search query submitted by the user. For example, if a user submits a highly descriptive search term (e.g., color), such as "red clogs," then the image selection application 121 can select an image that in fact corresponds to a red clog rather than experiment with placement of images 129 that may not correspond to a red clog.

The image selection application 121 can also generate image suggestions corresponding to images for which the image selection application 121 has determined with a high degree of confidence that a particular image is effective. In other words, the image selection application 121 can generate an image suggestion for other items in the same or similar category (e.g., a product category, etc.) that includes a suggestion that the other items 124 be associated with a primary image that is similar to the primary image of the item 124. In some embodiments, the image selection application 121 can employ a visual similarity engine that can compare the visual similarity of two images, and automatically select a primary image for an item 124 that is similar to a primary image that it has identified with a high degree of confidence as an effective image. This can be particularly useful for certain items 124 in the data store 112 for which there is a small sample size of information on which the image selection application 121 can generate an image score 131. In this scenario, the image selection application 121 can generate a suggestion that corresponds to a primary image for an item 124 for which a large sample size and a potentially high confidence score exists.

The image selection application 121 can also generate a suggestion corresponding to a primary image for an item 124 when a user attempts to create a listing and/or item in a particular product or item category. In such a scenario, a user via a user interface generated by the electronic commerce system 119 can create a listing in an electronic commerce system and/or an item in a product catalog. The image selection application 121 can determine the highest rated images from among a plurality of items in a particular category and present a suggestion to the user that he or she provide one or more images that are similar to the highest rated images. The highest rated images within a particular category can comprise those that are associated with a large sample size and/or a potentially high confidence score as calculated by the image selection application 121.

Figure 4A:
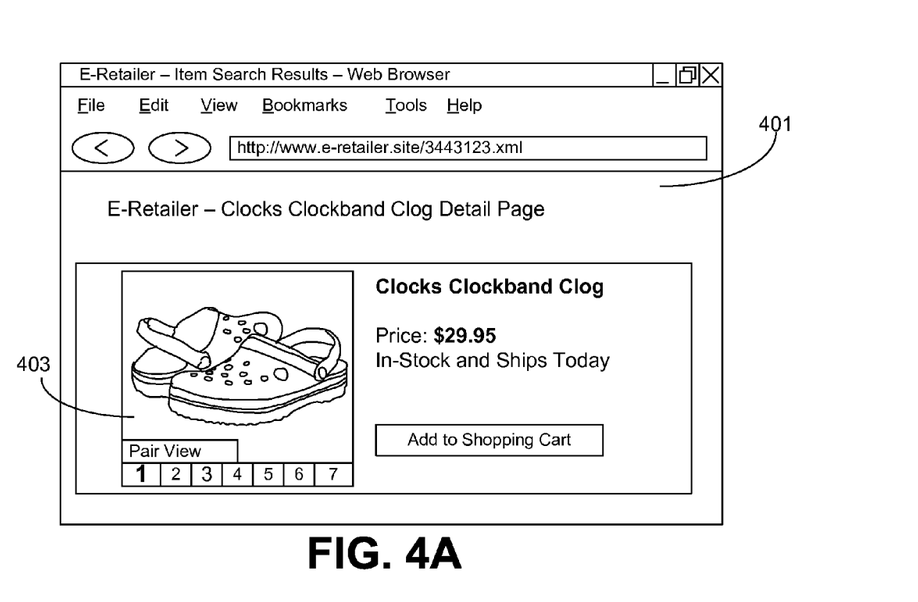
FIGS. 4A-4B are example user interfaces generated by the image selection application and/or the electronic commerce application executed in a computing device in the networked environment of FIG. 1 according to various embodiments of the present disclosure.
Figure 4B:
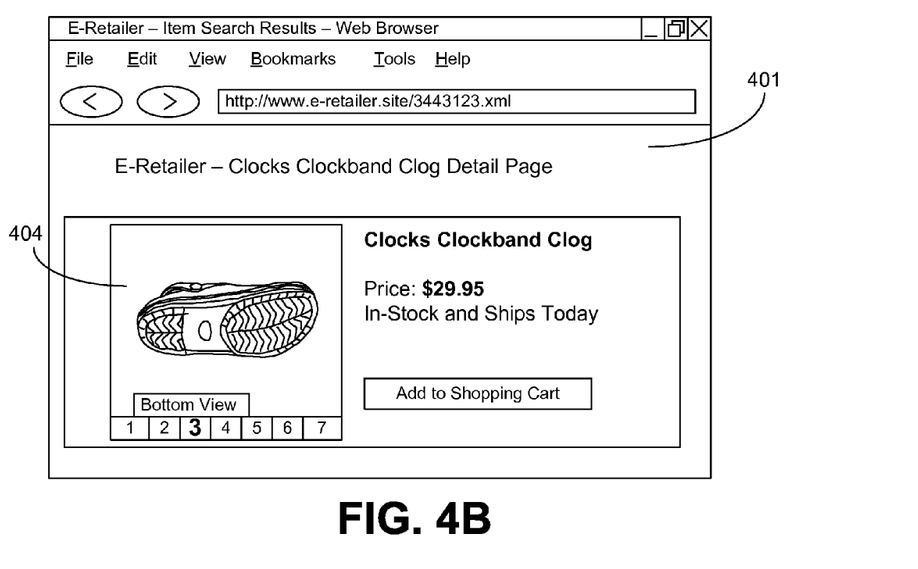

Reference is now made to FIGS. 4A and 4B, which illustrate an example of an item detail page 401, or a product detail page, that can be generated by the electronic commerce application 119 and/or image selection application 121 and rendered on a client 106. In the depicted example, the image selection application 121 can select the depicted image 403 as the primary image. In the non-limiting example of the item detail page 401 of FIG. 4A, the primary image is displayed as the first image in an image user interface element that allows the user to browse among a plurality of images associated with an item 124 in the data store 112. As shown in FIG. 4B, the user can view the image 404 by interacting with the image user interface element. In this scenario, the image selection application 121 can detect a positive interaction associated with image 404. In some embodiments, the image selection application 121 can also detect a negative interaction associated with image 403 if the user immediately selected another image using the image user interface element. However, in one embodiment, the image selection application 121 can detect a positive interaction associated with image 403 if the user views the primary image 403 for a minimum threshold amount of time, if the user zooms in on the image 403, centers the image 403, or otherwise indicates an interest in image 403 prior to selecting image 405.

Figure 5A:
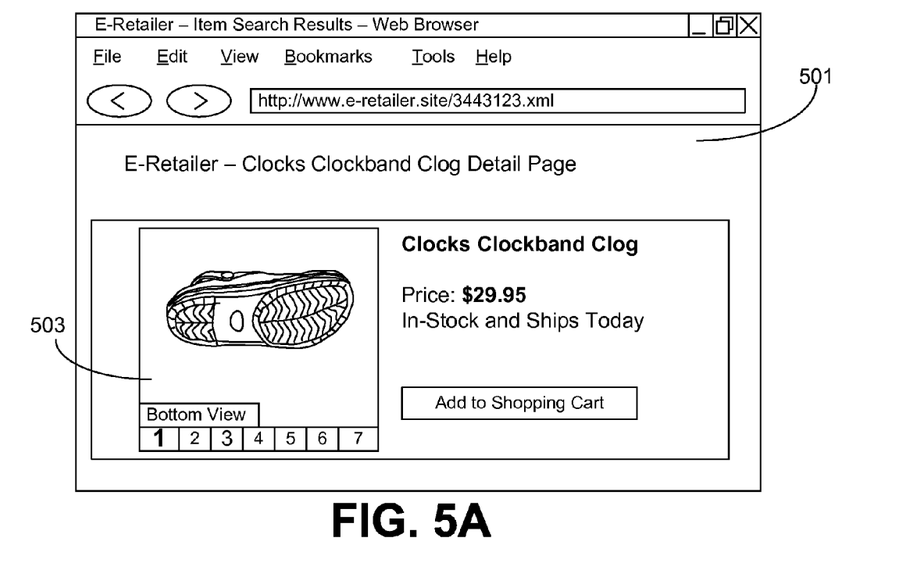
FIGS. 5A-5B are example user interfaces generated by the image selection application and/or the electronic commerce application executed in a computing device in the networked environment of FIG. 1 according to various embodiments of the present disclosure.
Figure 5B:
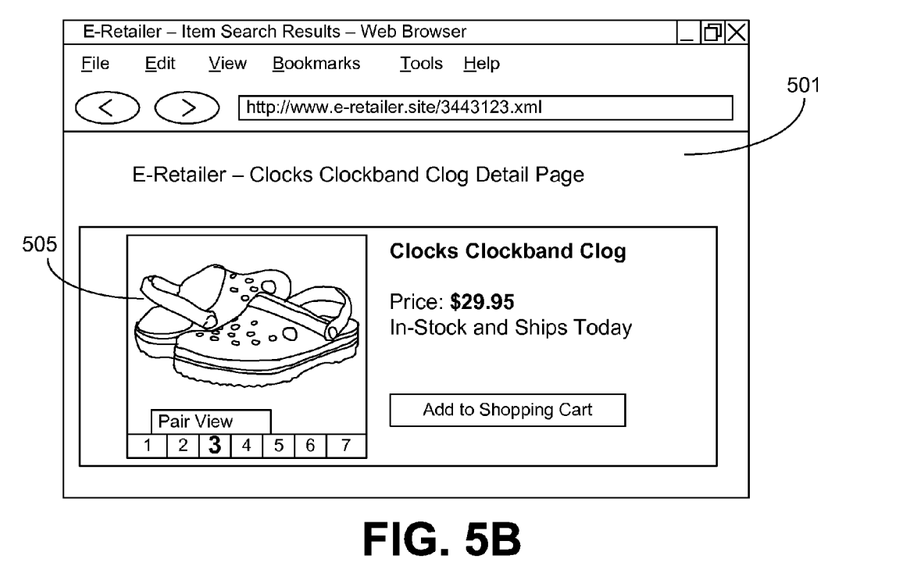

Continuing this example, reference is now made to FIGS. 5A and 5B. In the item detail page 501 of FIGS. 5A and 5B, a different image 503 is selected as the primary image. Accordingly, the image selection application 121 can monitor the user's interactions with the item detail page 501 and adjust the image scores 131 for each of the images 503, 505 based upon the detected interactions.

Figure 6:
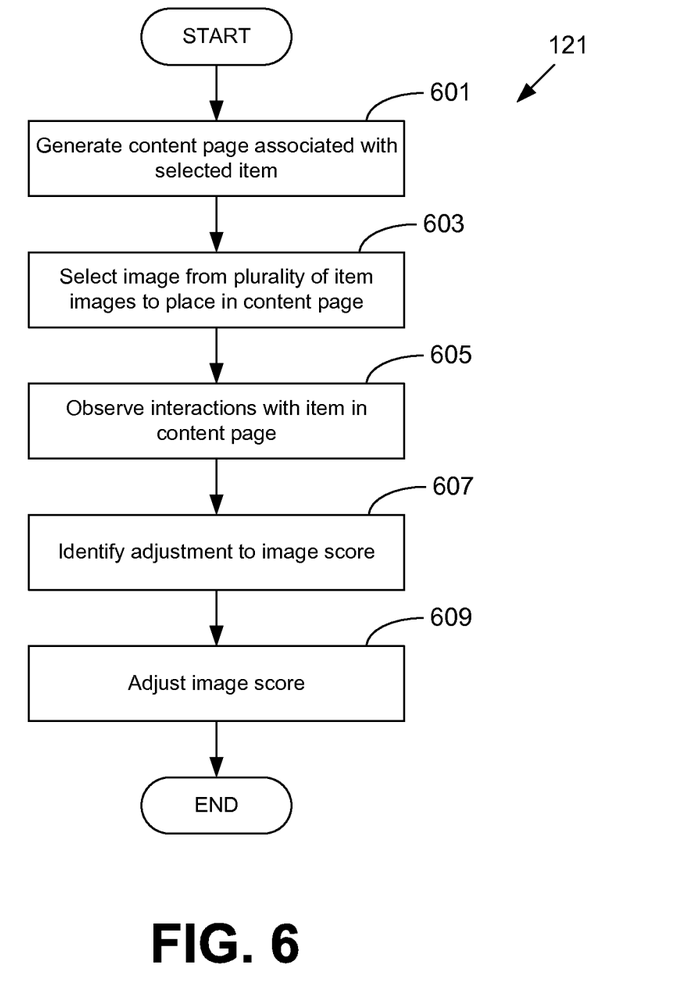
FIG. 6 is a flow chart that provides one example of the operation of the image selection application of FIG. 1 according to an embodiment of the present disclosure.

Turning now to FIG. 6, shown is a flowchart that provides one example of the operation of a portion of the image selection application 121 (FIG. 1) according to various embodiments. It is understood that the flowchart of FIG. 6 provides merely an example of the many different types of functional arrangements that may be employed to implement the operation of the portion of the image selection application 121 as described herein. As an alternative, the flowchart of FIG. 6 may be viewed as depicting an example of steps of a method implemented in the computing device 103 (FIG. 1) according to one or more embodiments.

Beginning at box 601, the image selection application 121 can generate a content page associated with an item 124. As noted above, such a content page can include a search result user interface that includes a reference to the item 124 as well as one of a plurality of images 129 associated with the item 124. Next, in box 603, the image selection application 121 selects an image 129 from among the various images associated with the item 124 to place in the content page. As noted above, the image can be selected randomly or on a weighted basis according to the image score 131 so that higher scored images 129 appear more often than lower scored images 129. In box 605, the image selection application 121 can then observe interactions with the item in the user interface. As described above, these interactions can include positive interactions and/or negative interactions.

In box 607, the image selection application 121 can then identify an adjustment to the image score 131 associated with the image that was selected in box 603. The adjustment can include an increase and/or decrease to the image score 131 based upon the interactions identified in box 605. The amount of the adjustment can also vary based upon the type of interactions detected in box 605. In box 609, the image selection application 121 can adjust the image score 131 corresponding to the image 129 selected in box 603. The image selection application 121 can also identify a highest scored image as a primary image, or an image that is most effective at achieving a particular result. As noted above, such a result can include maximizing a click-through rate, sales of an item, profitability of an electronic commerce system, or maximization and/or minimization of any other metric.

Figure 7:
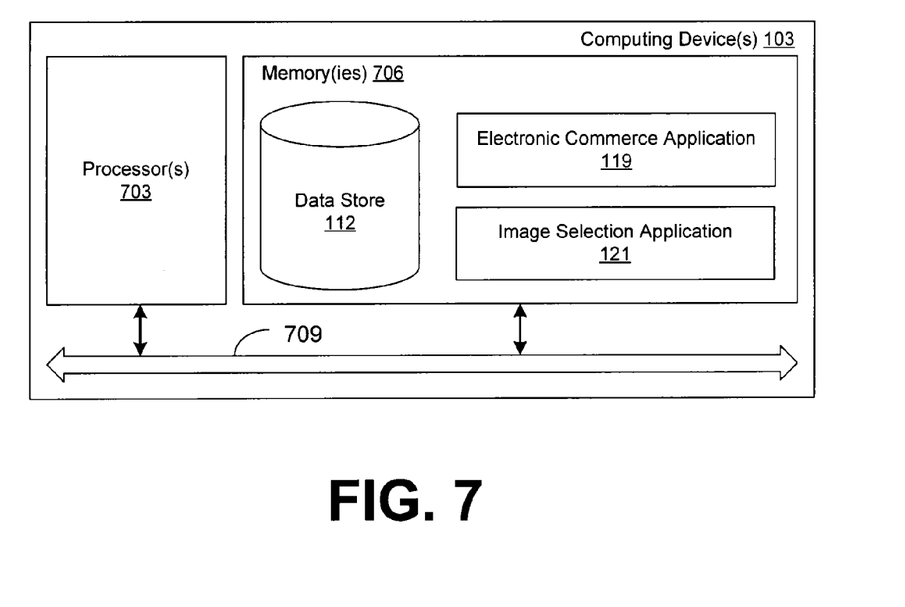
FIG. 7 is a block diagram of one example embodiment of a computing device in the networked environment of FIG. 1 according to various embodiments of the disclosure.

Moving on to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce application 119, image selection application 121, and potentially other applications. Also stored in the memory 706 may be a data store 112 and other data. In addition, an operating system may be stored in the memory 706 and executable by the processor 703. While not illustrated, the client device 106 also includes components like those shown in FIG. 7, whereby the image selection application 121 is stored in a memory and executable by a processor.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors and the memory 706 may represent multiple memories that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the image selection application 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows the functionality and operation of an implementation of portions of the image selection application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in flowchart of FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image selection application 121, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A non-transitory computer-readable medium embodying a program executable in a computing device, the program configured to cause the computing device to at least:

generate a first user interface, executable in the computing device, comprising information about at least one item, the first user interface being served to a plurality of client devices over a network, the first user interface comprising a first image associated with the at least one item, the first image being a randomly chosen one of a plurality of images associated with the at least one item, the first user interface further including client-side code configured to detect at least one user input provided by a user via a client device that renders the first user interface;

obtain, by the program executable in the computing device, at least one interaction with the at least one item from the first user interface of at least one of the plurality of client devices;

determine, by the program executable in the computing device, a respective weight assigned to the at least one interaction based at least upon the at least one interaction being one of a plurality of positive interactions or a plurality of negative interactions, wherein the one of the plurality of positive interactions comprises detection of a pointer positioned over the first image in the first user interface for a threshold period of time;

determine, by the program executable in the computing device, an adjustment to an image score corresponding to the first image corresponding to the at least one item based at least upon the respective weight, the adjustment being a positive adjustment when a respective positive interaction is obtained and a negative adjustment when a respective negative interaction is obtained, wherein the image score for each of the plurality of images is set to an initial value prior to an initial adjustment;

identify, by the program executable in the computing device, a primary image associated with the at least one item, the primary image being one of the plurality of images associated with the at least one item, wherein the primary image, based at least upon the image score, is a most effective image at achieving a result, wherein the result is maximizing a click-through rate associated with the at least one item;

generate, by the program executable in the computing device, a confidence score associated with the identification of the primary image, the confidence score based at least upon a statistical sample size associated with the image score;

generate, by the program executable in the computing device, a second user interface comprising information about the at least one item, the second user interface comprising the primary image;
select, by the program executable in the computing device, a second image associated with a second item from a plurality of second item images based at least upon performing a visual image similarity comparison between the primary image and the plurality of second item images; and
generate, by the program executable in the computing device, a third user interface comprising the second image.

2. A method, comprising: obtaining, in at least one computing device, a search query from a client device by way of a network;
generating, in the at least computing device, a first search result user interface comprising a first item with a respective item image responsive to the search query, the respective item image being one of a plurality of images corresponding to the a first item;
identifying, in the at least one computing device, an interaction with the first item in the first search result user interface by identifying a respective negative interaction with the first item, the respective negative interaction comprising at least one of: a user initiating a new search query without interacting with the first item or the user interacting with another item in the first search result user interface;
determining, in the at least one computing device, a respective weight assigned to the interaction based at least upon the interaction being one of a plurality of negative interactions;
identifying, in the at least one computing device, an adjustment to an image score associated with the respective item image based at least upon the interaction and the respective weight, wherein the image score for each of the plurality of images is set to an initial value prior to the adjustment;
reducing, in the at least one computing device, the image score by the adjustment;
identifying, in the at least one computing device, a highest scored one of the plurality of images based at least upon the image score;
in response to obtaining a subsequent search query, generating, in the at least computing device, the second search result user interface comprising the first item and the highest scored one of the plurality of images;
selecting, in the at least one computing device, a second image associated with a second item from a plurality of second item images based at least upon performing a visual image similarity comparison between the highest scored one of the plurality of images and the plurality of second item images; and
generating, in the at least one computing device, a third search result user interface comprising the second image.

3. The method of claim 2, further comprising designating the highest scored one of the plurality of images as a primary image of the first item, wherein the primary image is selected as a thumbnail image in a subsequent search result user interface more often than a remaining plurality of images associated with the first item.

4. The method of claim 2, wherein generating the first search result user interface further comprises randomly selecting one of the plurality of images corresponding to the first item.

5. The method of claim 2, wherein identifying the interaction with the first item in the first search result user interface further comprises identifying, in the at least one computing device, a positive interaction with the first item.

6. The method of claim 5, wherein identifying the positive interaction comprises identifying at least one of: a user following a hyperlink associated with the first item in the first search result user interface or a user purchasing the first item in an electronic commerce system.

7. The method of claim 6, wherein identifying the adjustment to the image score associated with the respective item image based at least upon the interaction further comprises identifying an increase in the image score when the positive interaction is identified, and identifying a decrease in the image score when the negative interaction is identified.

8. The method of claim 2, wherein identifying the adjustment to the image score associated with the respective item image based at least upon the interaction further comprises identifying a combination of interactions and corresponding adjustments to the image score that maximizes sales of the first item in an electronic commerce system.

9. The method of claim 2, wherein identifying an interaction with the first item in the first search result user interface, identifying an adjustment to the image score associated with the respective item image based at least upon the interaction, modifying the image score by the adjustment, and identifying a highest scored one of the plurality of images based at least upon the image score are performed by a machine learning algorithm executed in the at least one computing device, wherein the machine learning algorithm is configured to identify a highest scored one of the plurality of images that maximizes a metric.

10. The method of claim 9, wherein the metric is at least one of: a click through rate of the first item, sales of the first item in an electronic commerce system, or profitability of the electronic commerce system.

11. The method of claim 2, further comprising generating a confidence score associated with the highest scored one of the plurality of images, the confidence score reflecting a confidence level of the image score for the highest scored one of the plurality of images.

12. The method of claim 2, further comprising:
designating, in the at least one computing device, the similar second image as a highest scored image corresponding to the other second item.

13. A system, comprising:
at least one computing device;
an image selection application executable in the at least one computing device, the image selection application causing the at least one computing device to:
obtain, by the image selection application, from a client device by way of a network, a request for a first item detail page corresponding to a first item;
generate, by the image selection application, the first item detail page comprising an image user interface element by selecting a first image associated with the first item, the first image being one of a plurality of images associated with the first item, the first item detail page comprising a plurality of user-selectable components;
identify, by the image selection application, an interaction with at least one of the first image or the image user interface element by identifying a respective negative interaction with at least one of the first image or the first item, the respective negative interaction comprising at least one of: initiating a search for another item or viewing an alternate image via the image user interface element;

determine, by the image selection application, a respective weight assigned to the interaction based at least upon the interaction being one of a plurality of negative interactions;

identify, by the image selection application, an adjustment to an image score associated with the first image based at least upon the interaction and the respective weight, wherein the image score for each of the plurality of images is set to an initial value prior to an initial adjustment;

reduce, by the image selection application, the image score by the adjustment;

in response to obtaining a second request for the first item detail page corresponding to the first item, generate, by the image selection application, the first item detail page comprising a highest scored image of the plurality of images associated with the first item;

obtain, by the image selection application from the client device by way of the network, a third request for a second item detail page corresponding to a second item, the second item being associated with a product category of the first item;

select, by the image selection application, a second image associated with the second item from a plurality of second item images associated with the second item based at least upon performing a visual image similarity comparison between the first image and the plurality of second item images; and generate, by the image selection application, the second item detail page comprising the second image.

14. The system of claim 13, wherein the image selection application further causes the at least one computing device to generate, by the image selection application, the first item detail page and randomly select one of the plurality of images corresponding to the first item as the first image.

15. The system of claim 13, wherein the image selection application further causes the at least one computing device to identify, by the image selection application, a primary image from among the plurality of images, the primary image being a most effective image at achieving a predefined result.

16. The system of claim 15, wherein the image selection application further causes the at least one computing device to select, by the image selection application, the primary image as the first image in the image user interface element more often than a remaining plurality of images associated with the first item.

17. The system of claim 15, wherein the first item comprises a product available in an electronic commerce system, and the predefined result comprises maximizing sales of the first item in the electronic commerce system.

18. The system of claim 15, wherein identifying the primary image further causes the at least one computing device to generate, by the image selection application, a confidence score associated with identification of the primary image, the confidence score based upon at least one of: a statistical sample size or an effectiveness of the first image at achieving the result.

19. The system of claim 13, wherein identifying the interaction further causes the at least one computing device to identify, by the image selection application, a positive interaction with at least one of the first image or the first item, the positive interaction comprising purchase of the first item in an electronic commerce system.

20. The non-transitory computer-readable medium of claim 1, wherein the one of the plurality of positive interactions further comprises receiving user-input requesting to zoom in on the first image of the first item.

* * * * *